United States Patent
Pinckney (10) Patent No.: US 6,936,555 B2
(45) Date of Patent: Aug. 30, 2005

(54) GLASS CERAMICS BASED ON ZNO

(75) Inventor: Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 56 days.

(21) Appl. No.: 10/747,544

(22) Filed: Dec. 29, 2003

(65) Prior Publication Data

US 2004/0142809 A1 Jul. 22, 2004

Related U.S. Application Data

(60) Provisional application No. 60/437,294, filed on Dec. 31, 2002.

(51) Int. Cl.$^7$ ............................ C03C 10/02; C03C 13/04
(52) U.S. Cl. ............................ 501/10; 501/37; 385/141; 65/33.1; 65/385
(58) Field of Search ................ 501/10, 37; 385/141; 65/33.1, 385

(56) References Cited

U.S. PATENT DOCUMENTS

| | | | |
|---|---|---|---|
| 6,300,262 B1 | 10/2001 | Beall | 501/5 |
| 6,303,527 B1 | 10/2001 | Pinckney | 501/5 |
| 6,531,420 B1 | 3/2003 | Beall et al. | 501/5 |
| 6,632,758 B2 * | 10/2003 | Beall et al. | 501/10 |
| 2002/0028739 A1 | 3/2002 | Beall et al. | 501/5 |

FOREIGN PATENT DOCUMENTS

| | | | |
|---|---|---|---|
| DE | 67219 | 6/1969 | |
| WO | WO01/28943 | 4/2001 | ........... C03C/10/04 |
| WO | WO 01/28944 | 4/2001 | ........... C03C/10/04 |
| WO | WO02/090279 | 11/2002 | ........... C03C/10/02 |

OTHER PUBLICATIONS

G.H. Beall & D.A. Duke, Transparent Glass Ceramics, Journal of Material Science, 4, pp. 340–352 (1969).

\* cited by examiner

Primary Examiner—Karl Group
(74) Attorney, Agent, or Firm—Timothy M. Schaeberle (57) ABSTRACT

Disclosed is a substantially transparent glass-ceramic ceramic, and a method for making a glass-ceramic, exhibiting an aluminogallate spinel crystal phase and having a glass-ceramic composition that lies within the $SiO_2$—$Al_2O_3$—$ZnO$—$K_2O$—$Ga_2O_3$—$Na_2O$ system and particularly consisting essentially, in weight percent on an oxide basis, of 25–50% $SiO_2$, 15–45% $ZnO$, 0–26% $Al_2O_3$, 0–25% $K_2O$, 0–10% $Na_2O$, 0–32% $Ga_2O_3$, a $K_2O+Na_2O$ amount of greater than 10%, a $Al_2O_3+Ga_2O_3$ of greater than 10%, the glass ceramic microstructure containing a crystal phase comprising at least 15%, by weight, of hexagonal ZnO crystals. Another aspect disclosed is optical element selected from the group consisting of an optical fiber, a gain or laser medium, and an amplifier component, a saturable absorber, with the element comprising a transparent glass-ceramic of the same composition and containing a crystallinity of at least about 15% by weight of hexagonal ZnO crystals.

16 Claims, 4 Drawing Sheets

GLASS CERAMICS BASED ON ZNO

CROSS REFERENCE TO RELATED APPLICATION

This application claims priority from U.S. Provisional Application Ser. No. 60/437,294, entitled Transparent Gallate Glass-Ceramics, filed on Dec. 31, 2002.

BACKGROUND OF THE INVENTION

1. Field of the Invention

The present invention relates generally to glass-ceramics, in particular to substantially transparent glass-ceramics containing a microstructure comprising nanocrystalline hexagonal ZnO crystals as the major crystalline phase.

2. Technical Background

Glass-ceramics are polycrystalline materials formed by a controlled crystallization of a precursor glass. In general, the method for producing such glass-ceramics customarily involves three fundamental steps: first, melting a glass-forming batch containing the selected metallic oxides; second, cooling the melt to a temperature at least below its transformation range, while simultaneously forming a glass body of a desired geometry; and third, heating the glass body to a temperature above the transformation range of the glass in a controlled manner to generate crystals in situ. To develop nuclei in the glass, the glass will be heated initially to a temperature within or somewhat above the transformation range for a period of time; although there are certain compositions that are known to be self-nucleating and thus do not require the development of nuclei. Thereafter, the temperature will be raised to temperatures where crystals can grow from the nuclei. The resulting crystals are typically uniformly distributed and fine-grained. Internal nucleation permits glass-ceramics to have favorable qualities such as a very narrow distribution of particle size and a highly uniform dispersion of crystals throughout the glass host.

Transparent glass-ceramics are known in the art, with the classic study relating to transparency being authored by G. H. Beall and D. A. Duke in "Transparent Glass Ceramics," *Journal of Material Science,* 4, pp. 340–352 (1969). Glass-ceramic bodies will display transparency to the human eye when the crystals present therein are considerably smaller than the wavelength of visible light. In other words, transparency typically results from crystals less than 50 nm—preferably as low as 10 nm—in size, if there is a major refractive index difference between crystal and glass. Transparency in glass-ceramics, alternatively, can also be produced with crystals larger than 50 nm if the crystal birefringence and the index of refraction mismatch between the crystal phase and the glassy phase are both low. Transparent glass-ceramics, doped with transition elements can combine the optical efficiency of crystals with the flexibility of the forming of glass. For example, both bulk (planar substrates) and fiber forms can be fabricated from these glass-ceramics.

Recently, researchers have concentrated much effort to develop transparent glass-ceramics as hosts for transition metal ions. Transition metals have been used as optically active dopants in crystalline hosts because they fluoresce in the near infrared (700 nm to 2000 nm) region. Given the useful wavelength range and relatively wide bandwidth of many transition-metal dopants, much interest has arisen for their use in optical telecommunication applications, with the region from 1000 nm to 1500 nm being of particular interest. The current optical telecommunication medium is glass-based optical fiber. Inclusion of transition metal dopants into glasses, however, has unfortunately not produced fluorescence performances as good as in crystalline materials. The performance of transition metal ions tends to degrade in amorphous hosts, where the crystal field strength is much smaller than in even crystalline hosts.

Suitable glass-ceramic hosts, therefore, must be tailored such that transition elements will preferentially partition into the crystal phase. Some of these glass-ceramics have come from compositions such as those discussed the following applications. Co-pending U.S. patent application, Pub. No. 2002/0028739, entitled FORSTERITE GLASS-CERAMICS OF HIGH CRYSTALLINITY AND CHROME CONTENT, by George H. Beall, et al., and co-pending U.S. Pat. No. 6,300,262, entitled TRANSPARENT FORSTERITE GLASS-CERAMICS, by George H. Beall both of which disclose a family of, and a method of making, glass compositions based in the $K_2O$—$MgO$—$Al_2O_3$—$SiO_2$ system. U.S. Pat. No. 6,297,179, entitled TRANSITION-METAL GLASS-CERAMIC GAIN MEDIA, by George H. Beall et al., discloses transition-metal-doped glass-ceramic materials used as gain media or pump laser fiber in optical amplifiers and lasing mechanisms. WO 01/28944 entitled TRANSPARENT LITHIUM ORTHOSILICATE GLASS-CERAMICS, by George Beall, et al., discloses a family of glass compositions within the ternary $Mg_2SiO_4$—$Zn_2SiO_4$—$Li_4SiO_4$ system and exhibiting a predominate orthosilicate crystal phase. Lastly, U.S. Pat. No. 6,303,527 entitled Transparent Glass-ceramics Based on Alpha- and Beta-Willemite, by L. R. Pinckney discloses substantially and desirably totally transparent glass-ceramics, and which contain a willemite predominant crystal phase within the ternary $Mg_2SiO_4$—$Zn_2SiO_4$—$Li_4SiO_4$ system. Each of these patents and applications are co-assigned to the present assignee and the entire contents of both of these applications are incorporated herein by reference.

Transparent glass-ceramics which contain relatively small numbers of crystals can be of great use in cases where the parent glass provides an easy-to-melt or an-easy-to-form vehicle for a crystal. The single crystals may be difficult or expensive to synthesize, however they provide highly desirable features, such as optical activity. The crystals in the glass-ceramic are generally oriented randomly throughout the bulk of the glass contrary to a single crystal which has a specific orientation. Random orientation, and consequent isotropy, are advantageous for many applications. One example is that of optical amplifiers, where polarization-independent gain is imperative.

Bulk and thin-film ZnO materials are well known in the art. In general, ZnO is a wide band gap (3.3 eV) semiconductor material. One application known in the art is ZnO varistors which are ceramic composites used as voltage stabilization and transient surge suppression in electric power systems. The key feature of ZnO varistors are their high nonlinearity of the current-voltage characteristics. Also known in the art are transparent, electrically conductive polycrystalline films based on doped ZnO. Doped ZnO is an n-type semiconductor and is one of a family of transparent conducting oxides (TCOs) that are used in energy conserving windows, oven windows, "smart" windows and front-surface electrodes for solar cells and flat panel displays. Recently, a planar waveguide device for 1.55 $\mu$m amplification based on erbium-doped nanocrystalline ZnO was demonstrated. Lastly, prior art reveals the preparation of ZnO as nanoparticles in numerous colloidal solutions by various methods, including sol-gel, laser vaporization-controlled condensation, reversed micelle techniques. These particles exhibit quantum size effects; their band gap absorption and emission are blue-shifted with respect to bulk ZnO and their visible emission, in the 500 nm region, shows wavelength and lifetime dependence on size.

Although it is known in the art to utilize transparent ZnO, both in bulk form and as thin films, in optical applications, nothing has been found in the prior art to suggest the formation of transparent ZnO-crystal containing glass-ceramics capable of being utilized in both optical and dielectric applications.

Accordingly, the primary object of the present invention is to provide nanocrystalline hexagonal ZnO glass-ceramics glass-ceramic material which are substantially and desirably totally transparent which are capable of being doped with ingredients which confer useful optical and dielectric properties including, high absorption in the near infrared and microwave wavelengths.

Other objects and advantages of the present invention will be apparent from the following description.

SUMMARY OF THE INVENTION

In accordance with the present invention, one aspect of the invention disclosed is a substantially transparent glass-ceramic ceramic exhibiting a hexagonal ZnO crystal phase and having a glass-ceramic composition that lies within the $SiO_2$—$Al_2O_3$—$ZnO$—$K_2O$—$Ga_2O_3$—$Na_2O$—system and particularly consisting essentially, in weight percent on an oxide basis, of 25-50% $SiO_2$, 0-26% $Al_2O_3$, 15-45% ZnO, 0-25% $K_2O$, 0-10% $Na_2O$, 0-32% $Ga_2O_3$, $K_2O$+$Na_aO$>10%, and $Al_2O_3$+$Ga_2O_3$>10%. The glass ceramic microstructure exhibits a crystal phase comprising at least 15%, by weight, of hexagonal ZnO crystals.

One additional aspect of the invention relates to an optical element selected from the group consisting of an optical fiber, a gain or laser medium, and an amplifier component, a saturable absorber the element comprising: a transparent glass-ceramic containing a crystallinity of at least about 15% by weight of hexagonal ZnO crystals, the glass-ceramic having a composition consisting essentially, in weight percent on an oxide basis, of 25–50% $SiO_2$, 0–26% $Al_2O_3$, 15–45% ZnO, 0–25% $K_2O$, 0–10% $Na_2O$, 0–32% $Ga_2O_3$, $K_2O$+$Na_2O$>10%, and $Al_2O_3$+$Ga_2O_3$>10%.

In another aspect, the present invention relates to a method of making a substantially transparent glass-ceramic containing a hexagonal ZnO crystal phase and having a glass composition that lies within the $SiO_2$—$Al_2O_3$—$ZnO$—$K_2O$—$Ga_2O_3$—$Na_2O$—system, the method comprising the steps of:

a) melting a batch for a glass having a composition consisting essentially, in weight percent on an oxide basis, of 25–50% $SiO_2$, 0–26% $Al_2O_3$, 15–45% ZnO, 0–25% $K_2O$, 0–10% $Na_2O$, 0–32% $Ga_2O_3$, $K_2O$+$Na_2O$>10%, and $Al_2O_3$+$Ga_2O_3$>10%;

b.) cooling the glass to a temperature at least below the transformation range of the glass;

c.) exposing the glass to a temperature between about 550–950° C. for a period of time sufficient to cause the generation of a glass-ceramic which is substantially transparent and which contains a predominant, hexagonal ZnO crystal phase whose glass composition lies within the $SiO_2$—$Al_2O_3$—$ZnO$—$K_2O$—$Ga_2O_3$—$Na_2O$—system; and, d.) cooling the glass-ceramic to room temperature.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

The present invention is based on the discovery of a family of compositions that can produce glasses of excellent stability which can be cerammed to produce substantially transparent glass-ceramics containing hexagonal ZnO crystals as the predominant crystal phase.

The present inventive substantially transparent, hexagonal ZnO crystal-containing glass-ceramics exhibits a base composition consisting essentially, in weight percent on the oxide basis, of the following constituents:

| | |
|---|---|
| $SiO_2$ | 25–50%; |
| $Al_2O_3$ | 7–33%; |
| ZnO | 15–45%; |
| $K_2O$ | 0–20%; |
| $Na_2O$ | 0–15%; |
| $Ga_2O_3$ | 9–50%; |
| $K_2O$ + $Na_2O$ | >10%; |
| $Al_2O_3$ + $Ga_2O_3$ | >10%. |

The most preferred composition range, for best transparency, is based on a composition consisting essentially, in weight percent on an oxide basis, of:

| | |
|---|---|
| $SiO_2$ | 35–45%; |
| $Al_2O_3$ | 15–25%; |
| ZnO | 20–40%; |
| $K_2O$ | 12–22%; |
| $Ga_2O_3$ | 0–30%; |
| $Al_2O_3$ + $Ga_2O_3$ | 15–30%; |
| $Na_2O$ | 0–12%; |
| $K_2O$ + $Na_2O$ | 10–25%. |

Optional constituents, listed in weight percent on the oxide basis, that can be included in the inventive glass-ceramic, are as follows: 0–3% $Li_2O$, up to 5% CaO, BaO, $B_2O_3$, or SrO. Additionally up to 10%, by weight PbO and up to 20% $GeO_2$, can also be incorporated into the glass-ceramic.

It should be noted that levels of $SiO_2$ greater than 50% and $Na_2O$ higher than 12% should be avoided as they tend to promote the crystallization of undesirable willemite ($ZnSiO_4$) in the glass ceramic rather than the desirable ZnO crystals.

In general, zinc oxide, also known as zincite, exhibits the hexagonal wurtzite structure with the zinc atoms in hexagonal closest packing and all zinc and oxygen atoms in tetrahedral coordination. ZnO crystals generally exhibit the following properties: (1) a space group of P63mc; (2) a Mohs hardness of 4 (equivalent to that of fluorite, $CaF_2$); (3) a density of 5.68 $g/cm^3$; and, (4) indices of refraction $\epsilon=2.029$ and $\omega=20013$ (birefringence=0.016). The present inventive glass-ceramic exhibits a unique microstructure containing nanocrystalline ZnO crystals throughout a stable aluminosilicate or galliosilicate glass (5–20 nm); the presence of these very small crystal sizes provide the glass ceramic with high transparency, despite the presumed index mismatch between the crystals and the base glass.

The ZnO crystals which are present in the inventive microstructure provide tetrahedral sites into which small transition metal elements partition strongly into; total crystallinity ranging from 15–35%. This feature renders the crystals potentially valuable hosts for optically active transition elements including, but not limited to $Co^{2+}$, $Cr^{3+}$, $Cu^{1+}$, $Sn^{4+}$, $Mn^{4+}$, specifically up to about 2%, of the oxide by weight can be added to the precursor glass composition. Transition elements including, but not limited to $Sb^{3+}$, $Fe^{3+}$, $In^{3+}$, $Bi^{3+}$, $Ni^{2+}$, $V^{3+}$, $Ta^{5+}$, can also added to the glass composition in amounts up to 5% of the oxide, by weight.

As such, the present inventive ZnO crystal-containing glass-ceramics are suitable for utilization in the optical or telecommunications industry; bulk, planar and fiber forms can be formed and are useful in the aforementioned applications. In particular, the transition metal doped ZnO-crystal containing glass-ceramics of the present invention exhibit unique optical and dielectric properties including very high absorption in the near infrared and high microwave susceptibilities. As such, the inventive glass-ceramics can be used as optical components in a variety of elongated core applications. For instance, one useful application comprises an optical fiber in an optical amplifier or fiber laser. Other potential applications include waveguides and bulk gain media also for use in optical amplifiers and laser oscillators. Still further applications for the present glass-ceramic include utilization as saturable absorber media in laser applications. Finally, it is envisioned that the inventive transition metal doped ZnO crystal-containing glass ceramics could provide useful luminescent properties like that exhibited by the aforementioned doped ZnS nanoparticles.

EXAMPLES

The invention will be further clarified by the following examples set forth in Table I. Disclosed therein are a number of glass compositions, expressed in terms of parts by weight on the oxide basis, illustrating the parameters of the present invention. The Table also presents the glass color, the beat-treatment schedule in ° C. and hours, the glass-ceramic color, as well as the degree of transparency of 0.5–1.0 cm examples, ranging from low to medium (med.) to high, exhibited by each resulting glass-ceramic.

In as much as the sum of the individual components in each recited glass approximates 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

TABLE I

|  | 1 | 2 | 3 | 4 | 5 | 6 | 7 | 8 |
|---|---|---|---|---|---|---|---|---|
| $SiO_2$ | 37.2 | 32.5 | 44.0 | 38.5 | 35.8 | 38.7 | 38.7 | 34.2 |
| $Al_2O_3$ | 22.2 | 19.5 | 18.7 | 16.4 | 15.2 | 16.7 | 16.7 | 19.9 |
| ZnO | 20.0 | 30.0 | 20.0 | 30.0 | 35.0 | 29.2 | 29.2 | 29.2 |
| $K_2O$ | 20.6 | 18.0 | 17.3 | 15.1 | 14.0 | 15.4 | 15.4 | 13.7 |
| $Li_2O$ |  |  |  |  |  |  |  |  |
| $MnO_2$ |  |  |  |  |  | 0.3 |  |  |
| $Cu_2O$ |  |  |  |  |  |  | 0.2 |  |
| $Na_2O$ |  |  |  |  |  |  |  | 3.0 |
| CaO |  |  |  |  |  |  |  |  |
| $B_2O_3$ |  |  |  |  |  |  |  |  |
| $Ga_2O_3$ |  |  |  |  |  |  |  |  |
| NiO* |  |  |  |  |  |  |  |  |
| $Sb_2O_3$* |  |  |  |  |  |  |  |  |
| $P_2O_5$ |  |  |  |  |  |  |  |  |
| $In_2O_3$ |  |  |  |  |  |  |  |  |
| Glass Color | pale yellow | pale yellow | pale yellow | pale yellow | pale yellow | pink-taupe | turquoise | no color |
| Heat Treatment (° C./hr.) | 800°-2 | 750°-2 | 750°-2 | 750°-2 | 750°-2 | 750°-2 | 750°-2 | 700°-2 |
| Glass-ceramic Color | yellow transp. | yellow transp. | yellow transp. | yellow transp. | yellow transp. | olive green | reddish-brown | yellow-green |
| Degree of Transparency | med. | med. | high | high | med. | med. | med. | high |

|  | 9 | 10 | 11 | 12 | 13 | 14 | 15 | 16 |
|---|---|---|---|---|---|---|---|---|
| $SiO_2$ | 33.0 | 38.7 | 38.7 | 38.7 | 38.7 | 38.7 | 38.7 | 36.0 |
| $Al_2O_3$ | 14.0 | 16.7 | 16.7 | 16.7 | 16.7 | 16.7 | 16.7 | 16.4 |
| ZnO | 40.0 | 29.2 | 29.2 | 29.2 | 29.2 | 29.2 | 29.2 | 30.0 |
| $K_2O$ | 13.0 | 15.4 | 15.4 | 15.4 | 15.4 | 15.4 | 15.4 | 15.0 |

TABLE I-continued

|  |  |  |  |  |  |  |  |  |
|---|---|---|---|---|---|---|---|---|
| $Li_2O$ |  |  |  |  | 1.0 | 1.0 | 1.0 | 2.1 |
| $MnO_2$ |  |  |  |  |  |  |  |  |
| $Cu_2O$ |  |  |  |  |  |  |  |  |
| $Na_2O$ |  |  |  |  |  |  |  |  |
| CaO |  |  |  |  |  |  |  |  |
| $B_2O_3$ |  |  |  | 1.0 |  |  |  |  |
| $Ga_2O_3$ |  |  |  |  |  | 4.0 |  |  |
| NiO* |  | 0.2 |  |  |  |  |  |  |
| $Sb_2O_3$* |  |  | 2.0 |  |  |  |  |  |
| $P_2O_5$ |  |  |  |  |  |  | 1.0 |  |
| $In_2O_3$ |  |  |  |  |  | 3.0 |  |  |
| Glass Color | pale yellow | orange-brown | yellow | colorless | colorless | colorless | colorless | colorless |
| Heat Treatment (° C./hr.) | 750°-2 | 700°-2 | 700°-2 | 700°-2 | 700°-2 | 700°-2 | 700°-2 | 725°-1 |
| Glass-ceramic Color | yellow transp. | olive transp. | dark olive | pale yellow | pale yellow | pale yellow | pale yellow | yellow |
| Degree of Transparency | low | low | low | med. | high | med. | low | low |

|  | 17 | 18 | 19 | 20 | 21 | 22 | 23 | 24 |
|---|---|---|---|---|---|---|---|---|
| $SiO_2$ | 37.5 | 35.5 | 38.7 | 38.7 | 38.7 | 38.7 | 38.7 | 38.7 |
| $Al_2O_3$ | 16.4 | 16.4 | 16.9 | 16.9 | 16.9 | 16.9 | 16.9 | 16.9 |
| ZnO | 30.0 | 30.0 | 29.2 | 29.2 | 29.2 | 29.2 | 29.2 | 29.2 |
| $K_2O$ | 15.0 | 15.0 | 15.4 | 15.4 | 15.4 | 15.4 | 15.4 | 15.4 |
| $Li_2O$ | 1.0 |  |  |  |  |  |  |  |
| BaO |  | 3.0 |  |  |  |  |  |  |
| $ZnF_2$* |  |  | 2.0 |  |  |  |  |  |
| $Fe_2O_3$* |  |  |  | 1.0 |  |  |  |  |
| $Ga_2O_3$* |  |  |  |  | 8.0 |  |  |  |
| $SnO_2$* |  |  |  |  |  | 0.5 |  |  |
| $Ta_2O_5$* |  |  |  |  |  |  | 2.0 |  |
| $Sb_2O_3$* |  |  |  |  |  |  |  | 2.0 |
| $Ga_2O_3$ |  |  |  |  |  |  |  |  |
| PbO* |  |  |  |  |  |  |  |  |
| Glass Color | colorless | colorless | yellow | dark olive | v. pale yellow | amber | pink-tuape | amber |
| Heat Treatment (° C./hr.) | 700°-2 | 700°-2 | 700°-2 | 700°-2 | 700°-2 | 700°-2 | 700°-2 | 700°-1 |
| Glass-ceramic Color | pale yellow | yellow | yellow | dark olive | pale yellow | olive green | yellow-taupe | dark olive |
| Degree of Transparency | low | low | low | med. | high | low | low | low |

|  | 25 | 26 | 27 | 28 | 29 | 30 | 31 |
|---|---|---|---|---|---|---|---|
| $SiO_2$ | 35.9 | 34.7 | 34.1 | 33.7 | 32.7 | 33.3 | 38.7 |
| $Al_2O_3$ | 15.5 | 11.4 | 9.4 | 7.4 | 3.7 |  | 16.7 |
| ZnO | 27.0 | 26.2 | 25.7 | 25.4 | 24.7 | 25.2 | 29.2 |
| $K_2O$ | 14.2 | 13.8 | 13.6 | 13.4 | 13.0 | 13.3 | 15.4 |
| $Li_2O$ |  |  |  |  |  |  |  |
| BaO |  |  |  |  |  |  |  |
| $ZnF_2$* |  |  |  |  |  |  |  |
| $Fe_2O_3$* |  |  |  |  |  |  |  |
| $Ga_2O_3$* |  |  |  |  |  |  |  |
| $SnO_2$* |  |  |  |  |  |  |  |
| $Ta_2O_5$* |  |  |  |  |  |  |  |
| $Sb_2O_3$* |  |  |  |  |  |  |  |
| $Ga_2O_3$ | 7.4 | 13.9 | 17.2 | 20.2 | 25.9 | 28.2 |  |
| PbO* |  |  |  |  |  |  | 2.0 |
| Glass Color | yellow | yellow | colorless | colorless | colorless | colorless | colorless |
| Heat Treatment (° C./hr.) | 700°-2 | 700°-2 | 700°-2 | 700°-2 | 700°-2 | 700°-2 | 700°-2 |
| Glass-ceramic Color | Dark yellow | dark yellow | pale yellow | pale yellow | pale yellow | tranluc. opal | yellow |
| Degree of Transparency | low | low | low | low | low | tranluc. | med. |

*Transition metal oxide dopants in excess of 100%.

The exemplary glasses were produced in the following manner. The batch materials were compounded, mixed together to assist in securing a homogeneous melt, and then placed into platinum crucibles. The crucibles were introduced into a furnace operating at temperatures of 1575–1650° C., and the batches were melted for periods ranging between 4–16 hours. The melt was poured as free "patties" exhibiting a thickness of about 5 mm and thereafter transferred to an annealer operating at about 550–650° C.

Small coupons of each glass were subjected to a ceramming cycle by placing them into a furnace and heat treating according to the following schedule: heating the glass coupons at rate of 300° C./hr to temperature ranging between about 550° to 950° C., and thereafter holding the glass coupons at this temperature for a period ranging between about 1–2 hours, and thereafter cooling the glass coupons at furnace rate. This heat treatment was for a period of time sufficient to generate the development of nuclei therein, and thereafter sufficient to effect the growth of crystals on the nuclei.

It should be noted that the inventive compositions are self-nucleating due to liquid-liquid phase separation and therefore require no added nucleating agents. However, even though nucleating agents are not required, in some cases the addition of nucleating agents, such as $TiO_2$ (up to 5 wt. %), results in a finer crystal size and improved transparency.

The crystalline phases of the resulting glass-ceramic were identified using X-ray powder diffraction and the results indicated that each of the inventive glass-ceramics exhibited a predominant hexagonal ZnO crystal phase. Specifically, the glass-ceramic microstructures consisted of hexagonal ZnO nanocrystals, typically ranging between 5–20 nm in size, dispersed throughout a stable, continuous aluminosilicate or galliosilicate glass; the total crystallinity ranging between about 15%–35%.

Figure 1:
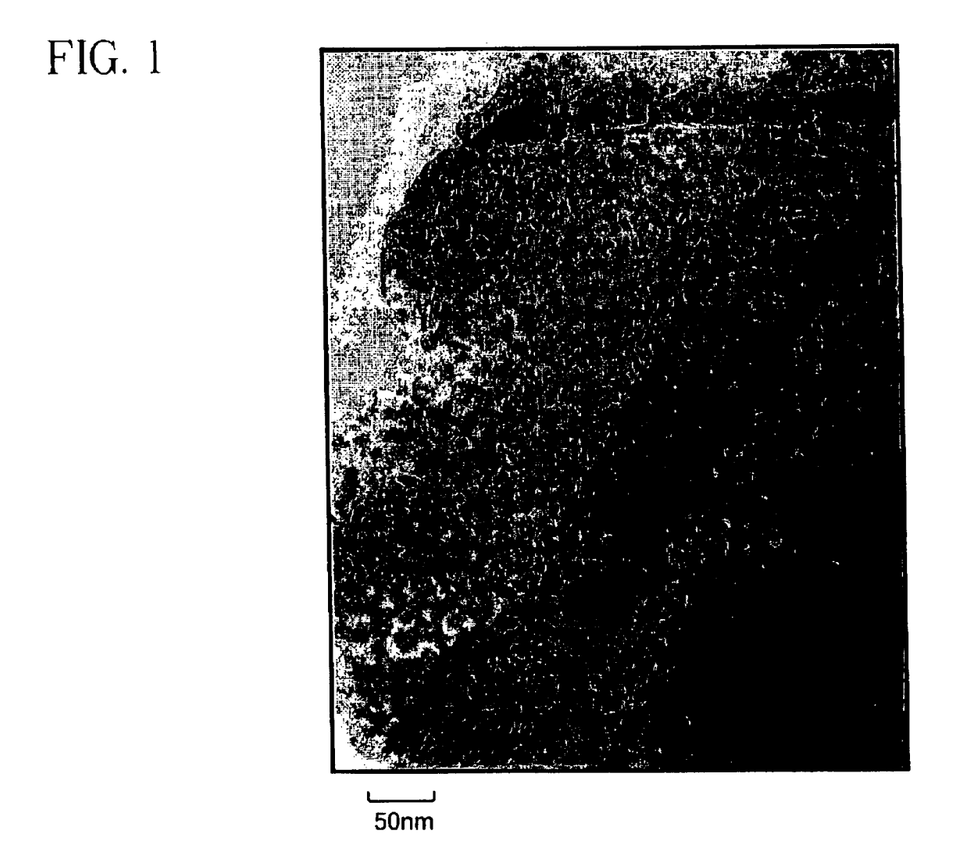
FIG. 1 is a scanning transmission electron micrograph (STEM) of an ion milled thin section of the glass-ceramic of Example 2.
Figure 2:
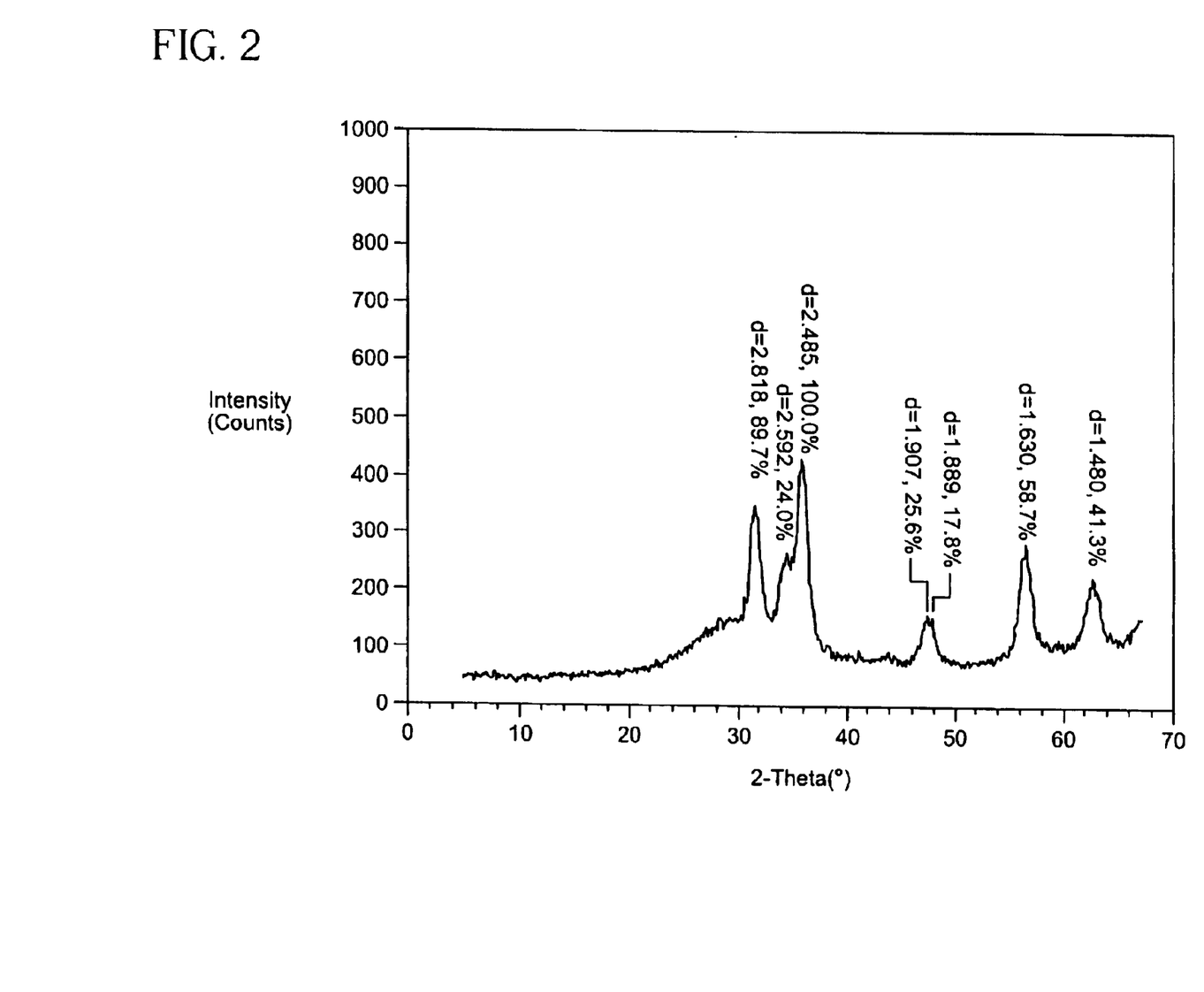
FIG. 2 is a graph illustrating the representative diffraction pattern of the crystalline phases exhibited by the glass-ceramic of Example 2.

FIG. 1 is an scanning transmission electron micrograph (STEM) taken at a magnification of 2000× (JEOL 2000FX) illustrating the crystalline microstructure of an ion milled thin section of Example 2; Bar=100 nm. FIG. 2 illustrates the diffraction pattern for the same Example 2; an examination of the X-ray diffraction pattern for this material example indicated that the sample exhibited broad ZnO peaks. It should be noted that this X-ray diffraction pattern is similar to that X-ray pattern exhibited by each of the 31 previously described examples; as such this X-ray diffraction is representative of that expected to be generated by any hexagonal ZnO crystal-containing glass-ceramic.

Figure 3:
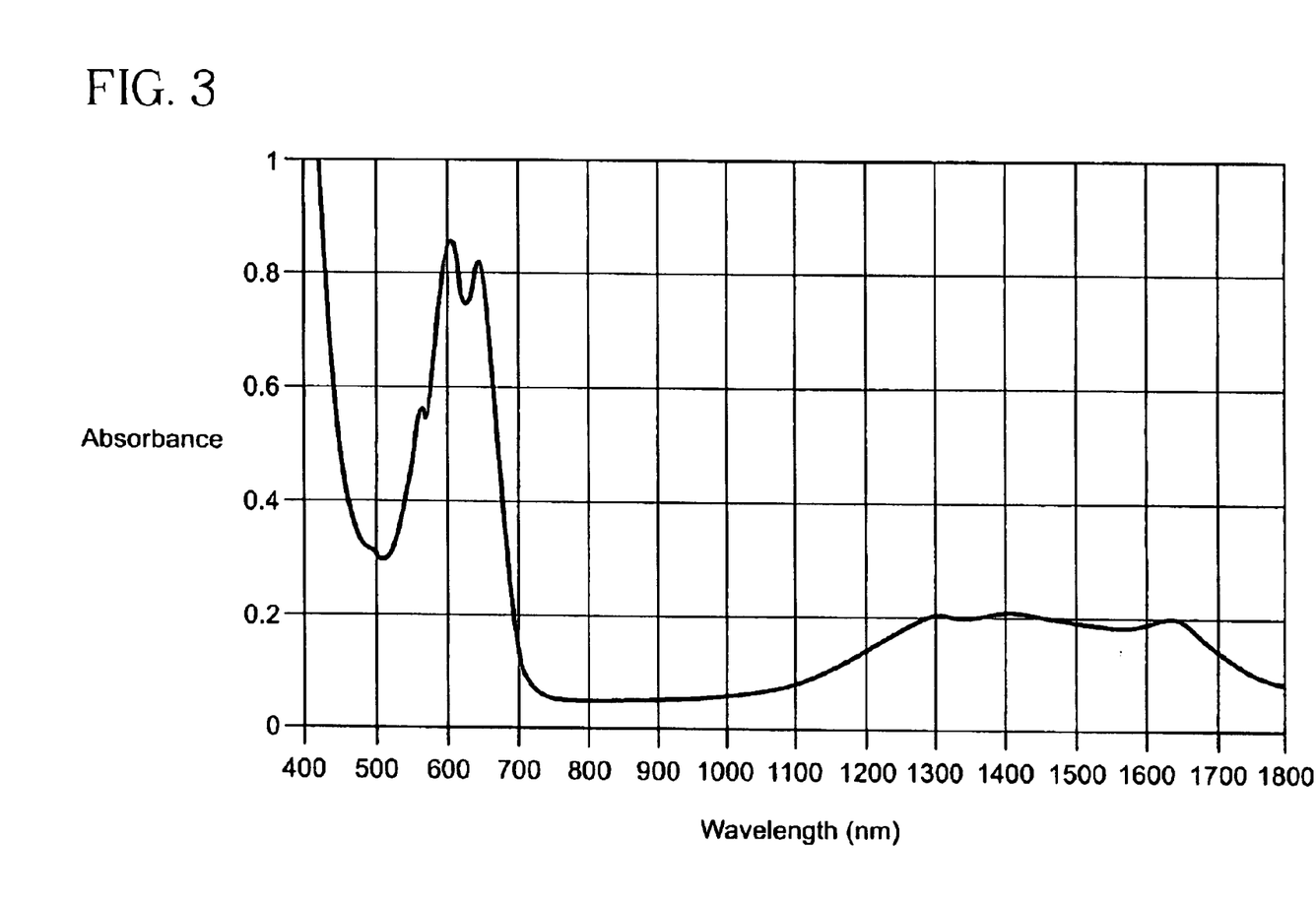
FIG. 3 is a graph illustrating the absorption curve for the cobalt oxide-doped ZnO crystal-containing glass ceramic of the present invention.

In the manner similar to that described above for forming Examples 1–31, an inventive cobalt oxide doped ZnO crystal-containing glass-ceramic, was formed of the following composition, in weight percent on the oxide basis: 38.7% $SiO_2$, 16.7% $Al_2O_3$, 29.2% ZnO, 15.4% $K_2O$, 2% $Co_2O_3$. FIG. 3 is a graph that illustrates the absorbance spectra of this cobalt oxide doped ZnO crystal-containing glass-ceramic. The graph reveals that the inventive cobalt-doped ZnO crystal-containing glass-ceramic example exhibits strong absorption in the visible wavelength, as well as moderately strong and uniform absorbance across the entire telecommunications bandwidth; i.e., the absorbance curves are particularly flat between 1250 to 1650 nm.

Figure 4:
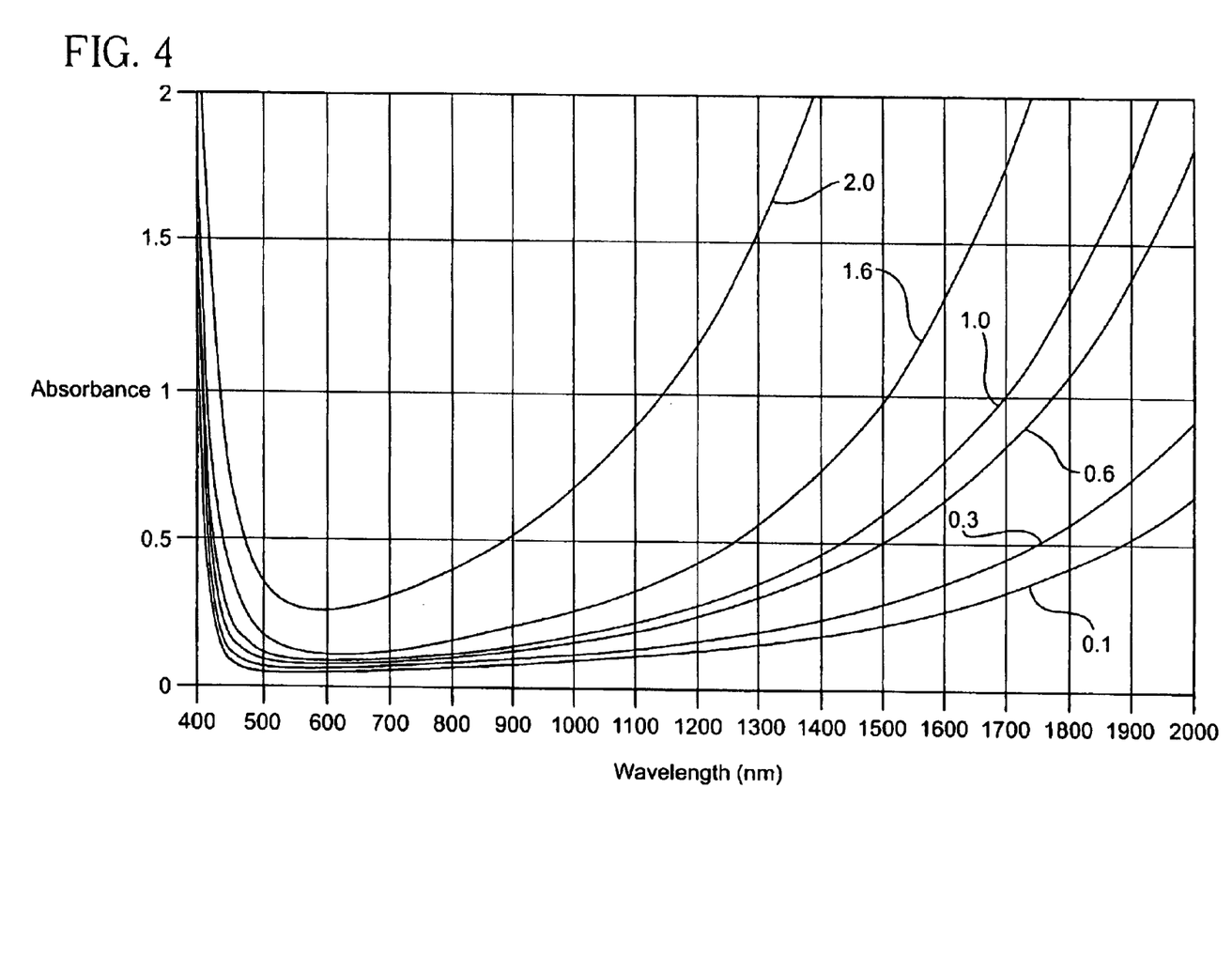
FIG. 4 is a graph illustrating the absorption curves for the inventive ZnO-crystal containing glass-ceramics doped with varying amounts of antimony oxide.

FIG. 4 illustrates the absorbance exhibited by 6 $Sb_2O_3$ doped ZnO crystal-containing glass-ceramics; specifically, containing increasing levels of antimony oxide ranging from 0.1 to 2.0%. The example containing 2.0% $Sb_2O_3$ is that example designated as Example 11 in Table I while the composition of the other 5, and the manner in which they were produced, were similar to that of Example 11, except for the varying amounts of $Sb_2O_3$. The graph reveals that the antimony oxide doped glass-ceramics exhibit increasing absorbance both as the wavelength is increased and the amount of the antimony oxide is increased. Furthermore, the graph illustrates that the absorption for all of the antimony doped ZnO crystal-containing glass-ceramic examples shown is quite strong across the entire telecommunications bandwidth, especially for those antimony doped glass ceramics containing 1% $Sb_2O_3$ or greater. The aforementioned absorbance makes these antimony doped ZnO crystal-containing glass-ceramics particularly suitable for use as a saturable absorber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A substantially transparent glass-ceramic whose composition lies within the $SiO_2$—$Al_2O_3$—ZnO—$K_2O$—$Ga_2O_3$—$Na_2O$ system and containing a hexagonal ZnO crystal phase, the composition consisting essentially, in weight percent on an oxide basis, of 25–50% $SiO_2$, 15–45% ZnO, 0–26% $Al_2O_3$, 0–25% $K_2O$, 0–10% $Na_2O$, 0–32% $Ga_2O_3$, a $K_2O+Na_2O$ amount of greater than 10%, a $Al_2O_3+Ga_2O_3$ of greater than 10%, the glass ceramic microstructure containing a total hexagonal ZnO crystallinity of at least 15%.

2. The glass-ceramic of claim 1 further comprising an additional optional constituent selected from, in weight percent on the oxide basis, 0–5% $Li_2O$, 0–5% CaO, 0–5% BaO, 0–5% $B_2O_3$, 0–5% SrO, 0–10% PbO and 0–20% $GeO_2$.

3. The glass-ceramic of claim 1 wherein said composition consists essentially, in weight percent on an oxide basis, of 35–45% $SiO_2$, 15–25% $Al_2O_3$, 20–40% ZnO, 12–22% $K_2O$, 0–30% $Ga_2O_3$, 15–30% $Al_2O_3+Ga_2O_3$, 0–12% $Na_2O$, 10–25% $K_2O+Na_2O$.

4. The glass-ceramic of claim 1 wherein the hexagonal ZnO crystal phase comprises nanocrystals having a size between about 5–20 nm.

5. The glass-ceramic of claim 1 wherein the crystal phase comprises between about 15–35%, by weight of ZnO hexagonal crystals.

6. The glass-ceramic according to claim 1, wherein said composition further comprises a transition metal ion selected from the group consisting of $Co^{2+}$, $Cr^{3+}$, $Cu^{1+}$, $Sn^{4+}$, $Mn^{4+}$, $Sb^{3+}$, $Fe^{3+}$, $In^{3+}$, $Bi^{3+}$, $Ni^{2+}$, $V^{3+}$, $Ta^{5+}$.

7. An optical element selected from the group consisting of an optical fiber, a gain or laser medium, an amplifier component, saturable absorber media, the element comprising: a transparent glass-ceramic containing a crystallinity of at least about 15% by weight of hexagonal ZnO crystals, the glass-ceramic having a composition consisting essentially, in weight percent on an oxide basis, of in weight percent on an oxide basis, of 25–50% $SiO_2$, 15–45% ZnO, 0–26% $Al_2O_3$, 0–25% $K_2O$, 0–10% $Na_2O$, 0–32% $Ga_2O_3+Na_2O$ amount of greater than 10%, a $Al_2O_3+Ga_2O_3$ of greater than 10%.

8. The optical element of claim 7 wherein the composition further comprises and additional optional constituent selected from, in weight percent on the oxide basis, of 0–5% $Li_2O$, 0–5% CaO, 0–5% BaO, 0–5% $B_2O_3$, 0–5% SrO, 0–10% PbO and 0–20% $GeO_2$.

9. The optical element of claim 7 wherein the composition consists essentially, in weight percent on an oxide basis, of 35–45% $SiO_2$, 15–25% $Al_2O_3$, 20–40% ZnO, 12–22% $K_2O$, 0–30% $Ga_2O_3$, 15–30% $Al_2O_3+Ga_2O_3$, 0–12% $Na_2O$, 10–25% $K_2O+Na_2O$.

10. The optical element of claim 7 wherein the hexagonal ZnO crystal phase comprises nanocrystals having a size between about 5–20 nm.

11. The optical element of claim 7 wherein the crystal phase comprises between about 15–35%, by weight of hexagonal ZnO crystals.

12. The optical element of claim 7 wherein said composition further comprises a transition metal ion selected from the group consisting of $Co^{2+}$, $Cr^{3+}$, $Cu^{1+}$, $Sn^{4+}$, $Mn^{4+}$, $Sb^{3+}$, $Fe^{3+}$, $In^{3+}$, $Bi^{3+}$, $Ni^{2+}$, $V^{3+}$, $Ta^{5+}$.

13. A method of making a substantially transparent glass-ceramic whose composition lies within the $SiO_2$—$Al_2O_3$—ZnO—$K_2O$—$Ga_2O_3$—$Na_2O$ system and containing a hexagonal ZnO crystal phase, the glass ceramic microstructure containing a total ZnO crystallinity of at least 15%, the method comprising the steps of:

e.) melting a batch for a glass having a composition consisting essentially, in weight percent on an oxide basis, of 25–50% $SiO_2$, 15–45% ZnO, 0–26% $Al_2O_3$, 0–25% $K_2O$, 0–10% $Na_2O$, 0–32% $Ga_2O_3$, a $K_2O+Na_2O$ amount of greater than 10%, a $Al_2O_3+Ga_2O_3$ of greater than 10%;

f.) cooling the glass to a temperature at least below the transformation range of the glass;

g.) exposing the glass to a temperature between about 550–950° C. for a period of time sufficient to cause the generation of a glass-ceramic which is substantially transparent and which contains a predominant, ZnO crystal phase crystal phase, the glass-ceramic composition within the $SiO_2$—$Al_2O_3$—ZnO—$K_2O$—$Ga_2O_3$—$Na_2O$; and, h.) cooling the glass-ceramic to room temperature.

14. The method of claim 13 wherein the glass is exposed to a temperature of about 650–950° C. for about 1–2 hours.

15. The method of claim 13 wherein said composition consists essentially, in weight percent on an oxide basis, of 35–45% $SiO_2$, 15–25% $Al_2O_3$, 20–40% ZnO, 12–22% $K_2O$, 0–30% $Ga_2O_3$, 15–30% $Al_2O_3+Ga_2O_3$, 0–12% $Na_2O$, 10–25% $K_2O+Na_2O$.

16. The method of claim 13 wherein said composition further comprises a transition metal ion selected from the group consisting of $Co^{2+}$, $Cr^{3+}$, $Cu^{1+}$, $Sn^{4+}$, $Mn^{4+}$, $Sb^{3+}$, $Fe^{3+}$, $In^{3+}$, $Bi^{3+}$, $Ni^{2+}$, $V^{3+}$, $Ta^{5+}$.

* * * * *